United States Patent [19]

Oishi et al.

[11] 4,054,252
[45] Oct. 18, 1977

[54] MAGNETIC TAPE CASSETTE

[75] Inventors: Kengo Oishi; Osamu Suzuki, both of Odarawa, Japan

[73] Assignee: Fuji Photo Film Co., Ltd., Minami-ashigara, Japan

[21] Appl. No.: 727,563

[22] Filed: Sept. 28, 1976

[30] Foreign Application Priority Data

Sept. 29, 1975 Japan .................................. 50-117351

[51] Int. Cl.$^2$ .......................... G03B 1/04; G11B 15/32; G11B 23/04
[52] U.S. Cl. .................................... 242/199; 360/132
[58] Field of Search .......... 242/192, 195, 76, 201–210, 242/67.3; 352/72–78 R, 78 C, 125, 130; 360/76, 132

[56] References Cited

U.S. PATENT DOCUMENTS

| 3,684,203 | 8/1972 | Tollkuhn | 242/67.3 |
| 3,871,755 | 3/1975 | Wright | 352/130 |
| 3,991,956 | 11/1976 | Machida | 242/199 |

Primary Examiner—Leonard D. Christian
Attorney, Agent, or Firm—Sughrue, Rothwell, Mion, Zinn and Macpeak

[57] ABSTRACT

A magnetic tape cassette including tape guide supporting mechanisms, each being disposed frontwardly of each fixed pin closest to each reel to uniformly align the reeling surface and to stabilize the travelling of a tape.

2 Claims, 3 Drawing Figures

MAGNETIC TAPE CASSETTE

BACKGROUND OF THE INVENTION

1. Field of the Invention

The present invention relates to a magnetic tape cassette and more particularly to a magnetic tape cassette having a reel on which magnetic tape is wound and a takeup reel.

2. Description of the Prior Art

Recently, cassette tape recorders have been proposed which are miniaturized and light-weight and use a miniaturized magnetic tape. The magnetic tape received within the cassette of this type should provide recording and reproduction of high density for a long period of time. In order to fulfill the needs noted above, tapes such as the so-called C-120, C-100 tapes and the like are proposed. Moreover, to achieve higher density recording, the surface of a recording medium must be treated with a mirror face finish.

In a well known guide mechanism for guiding a cassette tape as shown in FIG. 1, if the tape has a good surface and is thin, such as noted above, the tape often becomes curled up dishwise or stepwise, in the case where the coefficient of sliding friction between layers of a recording surface of the tape and a backing material of the adjacent turn of the tape on the reel is large, e.g., more than 0.4, or if a layer of air in the space between the layers cannot be removed. This results in the occurrence of a loop or jamming as well as deformation of the tape itself, and in the worst case, causes stoppage of tape travel. This tendency is marked as the speed of tape increases.

As shown in FIG. 1, a well known tape travel guide mechanism for a cassette tape comprises a pair of reels 2 and 3 encased in a hollow case 1 formed by fixing an upper case 1a and a lower case 1b by means of fixing members 1c, a round rod like fixed pin 4, a rotary guide roller 5, a pressing pad 6, a rotary guide roller 7, a round rod like fixed pin 8, and a pair of flat guide plates 9 (only one shown in FIG. 1) disposed between the inner sides of said upper case 1a and lower case 1b and the opposite sides, respectively, of said reels 2 and 3.

Tape T, wound on the reel 2, is fed to the reel 3 orderly passing through the fixed pin 4, rotary guide roller 5, pressing pad 6 for urging tape T against a recording and reproducing head, rotary guide roller 7, and fixed pin 8, in such a manner that opposite edge portions of the tape are guided by the guide plates 9 so as to prevent displacement of the tape in the direction of the width of the tape T.

However, the prior art cassette as previously mentioned poses a drawback such that when the tape T is quickly reversed in its travel direction the relatively great contact angle of the tape and fixed pin causes increased tension. The accumulated stress is not completely released but instead rapidly increases to the point where tape breakage or creases occur. At the same time the tape tends to be transported towards the pressing pad 6 or the reels 2 and 3, and as a consequence a signal recorded on the track becomes abnormal. Also the tape is forcibly subjected to one sided correction in the width direction by the guide plate 9 or the like when the former is reeled on the reel 2 or 3 to increase the back tension.

SUMMARY OF THE INVENTION

The present invention overcomes the disadvantages noted above with respect to prior art cassettes by providing a magnetic tape cassette which can unreel and reel a magnetic tape while properly positioning both edges of the magnetic tape.

The above object of the invention may be achieved by a magnetic tape cassette wherein the travelling path of the tape comprises fixed pins and rotary guide rollers, characterized in that a tape guide supporting mechanism is disposed frontwardly of the fixed pin closest to each reel (that is, on the side of each reel) on said tape travelling course, said mechanism being positioned adjacent said fixed pin.

DESCRIPTION OF THE PREFERRED EMBODIMENT

Figure 1:
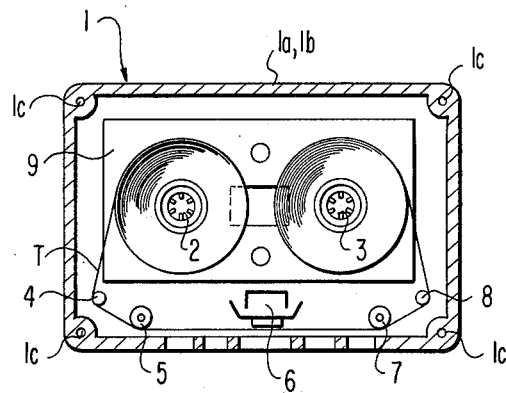
FIG. 1 is a plan view partially cutaway of a conventional cassette.
Figure 2:
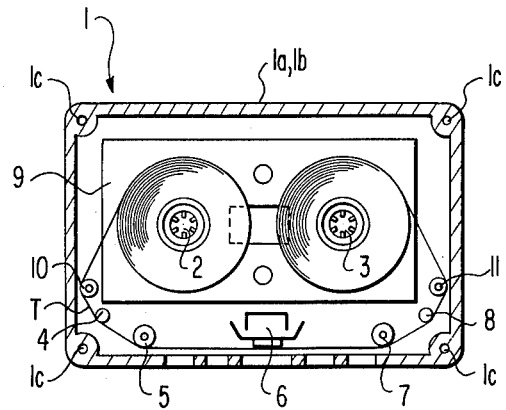
FIG. 2 is a plan view partially cutaway of a cassette according to the present invention.

Referring now to FIG. 2, which is a partially cutaway view of a cassette according to the present invention, there is shown a magnetic tape cassette which comprises: a pair of reels 2 and 3 encased in a hollow case 1 formed by fixing an upper case 1a and a lower case 1b by means of fixing members 1c, a round rod like fixed pin 4, a rotary guide roller 5, a pressing pad 6, a rotary guide roller 7, a round rod like fixed pin 8, a pair of flat guide plates 9 disposed between the inner sides of said upper case 1a and lower case 1b and the opposite sides of said reels 2 and 3, and tape guide supporting mechanisms 10, 11 composed of a hard plastic material, such as polyacetal. The supporting mechanisms 10 and 11 are rotatably supported at positions slightly upwardly of said fixed pins 4 and 8, respectively, and have flange members on opposite ends thereof. The supporting mechanisms guide and support the tape T immediately after it is reeled back to or immediately before it is taken up from said reels 2 and 3.

The cassette operates as follows:

The tape T, unreeled from the reel 2, first contacts and is supported by the outer peripheral surface of the roller portion of the tape guide supporting mechanism 10. The position of the edges of the tape is determined by and the tape itself is thus guided by the flange portions of the mechanism 10. The tape is transported along the outer peripheral surfaces of the fixed pin 4, rotary guide roller 5, pressing pad 6, rotary guide roller 7, and fixed pin 8. The tape then contacts and is supported around the outer peripheral surface of the roller portion of the tape guide supporting mechanism 11 in the same manner that it is guided and supported by mechanism 10. Thus, during the course of the tape travel the displacement of the tape T in the width direction is immediately corrected by the aforementioned tape guide supporting mechanisms 10 and 11. Consequently, the tape edge portions on the reels 2 and 3 come in sliding contact with the inner wall surface of the guide plate 9, whereby the degree of sliding contact is materially decreased.

Moreover, since the tape guide supporting mechanisms 10, 11 are disposed adjacent the fixed pins 4, 8, respectively, in a manner so as to be positioned slightly upwardly of the fixed pins 4, 8, a contact angle of tape T with respect to the fixed pins 4, 8 is reduced to thereby support the tape T without impairing the release of stress remaining in the tape T.

It is suggested that the mounting position of mechanisms 10, 11 be selected such that the tape contact angle on the fixed pins 4, 8 is as small as possible while also keeping the tape contact angle of the tape guide supporting mechanisms 10, 11 small, for example, not exceeding 90°.

It should be noted that the tape guide supporting mechanisms 10, 11 are not limited to hard plastic as previously mentioned, but a metal material may also be used if it is a nonmagnetic metal.

While the tape guide supporting mechanisms 10, 11 are composed of rotatable roller portions with flanges in the preceding movement, the mechanisms may be modified to the form of a circular cylinder or semi-circular cylinder with flange, or a fixed polygonal cylinder with flange, and in addition, the flange member can be provided only on one side of the mechanism or can be removed depending upon the rigidity, travelling speed of the tape T, and the like. In this case, however, it is suggested that the tape guide supporting mechanisms 10, 11 are positioned so that the tape contact angle thereof may be maintained at a smaller value.

While the tape supporting outer peripheral surface in the tape guide supporting mechanisms 10, 11 is provided with a curved surface having a radius of curvature of 0.5 to 5 mm or a polygonal surface analogous thereto in the aforementioned embodiment, it is suggested that the curved surface be limited to have radius of curvature of 0.5 to 2 mm in order to provide a compactness of the magnetic tape cassette.

The cassette of the present invention described above affords novel effects as follows:

1. Since the tape guide supporting mechanisms 10, 11 are disposed upwardly of the fixed pins 4, 8, the contact angle of the fixed pins 4, 8 to the tape T is reduced to further smooth the release of stress remaining in the tape T, thereby being capable of materially decreasing breakage or creases in the tape T which tend to be produced at the fixed pins with a large contact angle.

2. Since displacement of the tape edge portions in the width direction are corrected by the tape guide supporting mechanisms 10, 11, the tape edges will have less sliding contact with the guide plate 9, thereby decreasing the back tension of the tape T.

3. Because of the effects noted in (1) and (2) above, the surfaces of the reel of tape will be orderly aligned. Further, the travelling of the tape through its travelling path may be stabilized, resulting in a more faithful reproduction.

For a better understanding of the aforementioned effects, an embodiment of the invention and a prior art cassette were tested. The results will be given below.

EMBODIMENT 1

Within a Phillips made cassette, guide supporting mechanisms, which are composed of a polyacetal material, with roller portions of 4 mm outside diameter and having flange members on opposite ends thereof, were rotatably supported and disposed upwardly of the fixed pins of the Phillips cassette.

The contact angle of the tape to the fixed pin was approximately 10°, and the tape guide supporting mechanism was positioned so that the contact angle can be maintained from about 10° to 35°.

The tape used was a high density recording magnetic tape composed of a support layer of polyethylene terephthalate film having a thickness of 6 $\mu$ and a width of 3.8 mm, with a magnetic layer having a thickness of 3 $\mu$ formed on one surface of the support; the tape having a full length of 180 m.

The cassette with the aforesaid tape encased therein was loaded on a cassette tape recorder (National RQ-55), and the tape was unreeled and reeled 50 times at an average travelling speed of 4.8 cm/sec to measure the state of reeling surface of the tape, takeup torque, and deformation of tape, the results of which were as given in Table 1.

COMPARISON EXAMPLE 1

The same tape as that of Embodiment 1 was charged into a solid type Phillips made cassette used in Embodiment 1 (but, not provided with tape guide supporting mechanisms) to measure the same items as those of Embodiment 1 under the same conditions as those of Embodiment 1, the results of which are given in Table 1.

TABLE 1

| | Embodiment 1 | | Comparison Example 1 | |
|---|---|---|---|---|
| | (a) | (b) | (a) | (b) |
| Reeling surface | 80% | 75% | 35% | 45% |
| Initial takeup torque | 80 – 90 g-cm | | 80 – 90 g-cm | |
| Takeup torque after 50 times of travel | 90 – 100 g-cm | | 100 – 150 g-cm | |
| Tape deformation | Not present | | One sided elongation in tape edge portions | |

Note: The above measurements were made according to the following procedure.

1. State of reeling end surface

Figure 3:
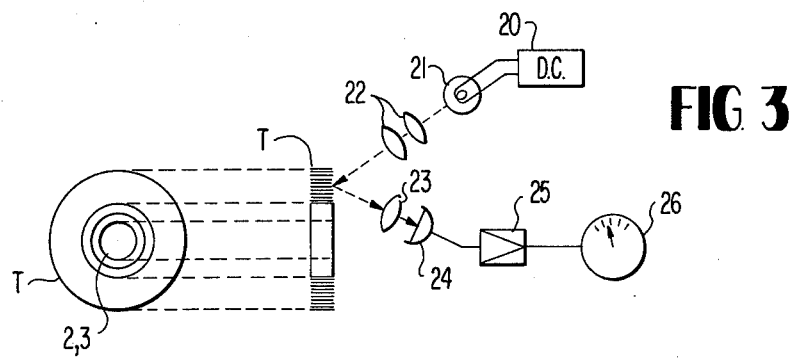
FIG. 3 is a conceptual view of a device for measuring a condition of the edge surface of a reel of tape.

The value in PLAY condition is indicated at (a) while the value in REW condition is indicated at (b). The appraisal of the surface condition has been found in accordance with a process shown in FIG. 3. In FIG. 3, there is shown a DC power source 20 for lighting a lamp 21, a lens 22 for condensing the light from the lamp 21 onto the surface of a reeled tape, and a lens 23 for condensing the light of lamp 21 reflected from the reeled tape surface. The light is electrically converted by means of a photo-transistor 24, amplified by amplifier 25, and read out on a meter 26 which represents the reflection factor in percent. The smoother the reeled surface of the tape, the higher the reflection factor, the quality of which may be judged by the present measurement. Calibration is made with the reflection factor set to 100% when a mirror is used in place of the reeled tape.

(2) and (3) Takeup torque (Initial and after 50 times of travel)

An Information Terminal Co. M-400 torque meter was used for these measurements.

4. Tape deformation

The tape surface after 50 times of travel was visually observed. Comparing the embodiment 1 of the cassette according to the invention with the Comparison Example 1 of the prior art cassette, it has been proved from the measured results given in Table 1 that the former was far superior to the latter in every respect.

While the invention has been described in detail and with reference to specific embodiments thereof, it will be apparent to one skilled in the art that various changes and modifications can be made therein without departing from the spirit and scope thereof.

What is claimed is:

1. A magnetic tape cassette including a hollow case, a pair of reels mounted within said hollow case, a magnetic tape wound onto at least one of said reels, a pressing pad for urging said tape against a recording and reproducing head, a pair of round rod guide members for guiding said tape and a pair of rotary guide members individually mounted between said round rod guide members and said pressing pad; the improvement comprising, a pair of tape guide mechanisms individually disposed between each of said reels and said round rod guide members in a position which will reduce the contact angle between said round rod guide members and said tape as compared to what it would be in the absence of said tape guide mechanisms; said tape guide mechanisms having flange portions for supporting the tape in the width direction as it reels onto and unreels from the respective reels.

2. A magnetic tape cassette as claimed in claim 1, wherein each said tape guide mechanism is a roller rotatably supported in said cassette.

* * * * *